Oct. 26, 1926.

L. E. LA CROIX

UNIVERSAL DRIVING COUPLING

Filed Sept. 18, 1925

1,604,699

Louis E. LaCroix  Inventor

Patented Oct. 26, 1926.

1,604,699

UNITED STATES PATENT OFFICE.

LOUIS E. LA CROIX, OF BALTIMORE, MARYLAND.

UNIVERSAL DRIVING COUPLING.

Application filed September 18, 1925. Serial No. 57,166.

The present invention relates to power transmitting connections, and more particularly to a universal driving joint.

An object of the present invention is to provide a universal joint of that character which may be employed between the sections of a power or drive shaft for effectively connecting the same together to turn as a unit, and to admit of a relatively wide range of angular movement between the shaft sections without weakening the connection and without binding or effecting any appreciable resistance to the operation of the shaft.

Another object of the invention is to provide a universal driving connection of this character which permits of the swinging of one section substantially thirty degrees with respect to the axis of the other section so that the universal driving connection may be adapted for various uses where considerable angular movement is necessary, such as; when the shaft is used for driving a steering wheel of a front drive motor vehicle.

The invention further aims to provide a universal drive coupling of this nature which admits of easy and quick assembly, which is reinforced where the strain is the greatest, and which is so constructed that it may be housed and protected without interfering with the free swinging of the coupling and without requiring external supports or braces.

A still further object of the invention is to provide a novel construction of gimbal block which is relatively strong and which is capable of shifting longitudinally in its sockets, and which is constructed with respect to the sockets so as to shift axially therein incident to the various angular positions and movements of the sockets on the gimbal block.

The above and various objects and advantages of this invention will in part be described in and in part be understood from the following detailed description of the present preferred embodiment, the same being illustrated in the accompanying drawing, wherein.

Figure 1:
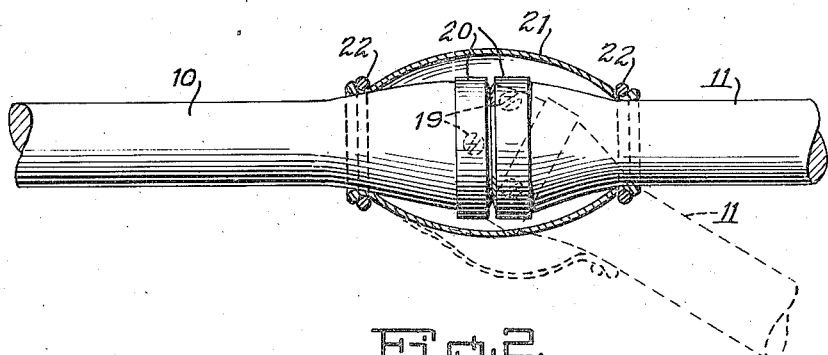
Fig. 1 is a side elevation partly in section of a power transmitting universal coupling constructed according to the present invention, the dotted lines showing one relative angular position between the shaft sections.

Referring to the drawing 10 and 11 designates a pair of drive shaft sections adapted to transmit power between the same. The shaft section 10 is provided with a cylindrical enlargement 12 on its inner end which is hollow to form a socket and the socket is provided with a relatively deep or elongated opening 13 the inner end of which is given substantially semi-spherical form and merges into the inner cylindrical wall of the socket 12.

Figure 2:
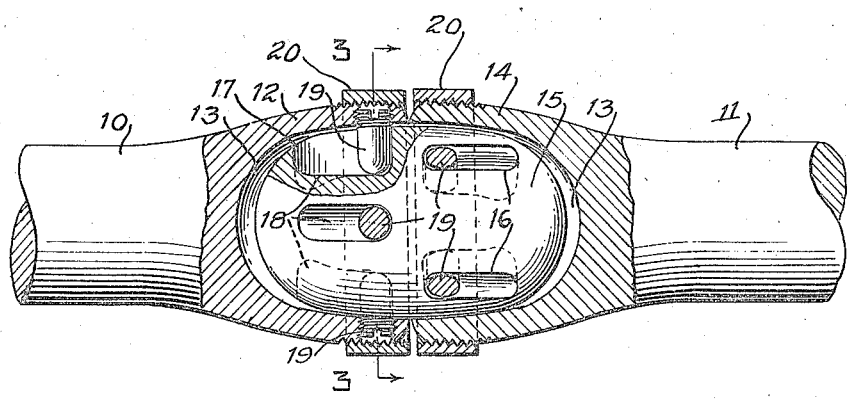
Fig. 2 is an enlarged longitudinal section taken through the coupling.

The shaft section 11 is similarly provided with a socket 14 corresponding in shape to the socket 12, and the two sockets 12 and 14 are adapted to receive therein the opposite ends of an elongated substantially elliptical gimbal block 15. As shown in Fig. 2, the gimbal block 15 is of a length slightly less than the lengths of the openings 13 in the sockets 12 and 14 so that the rounded ends of the gimbal block 15 may have a free sliding action against the inner surfaces of the sockets 12 and 14.

Figure 3:
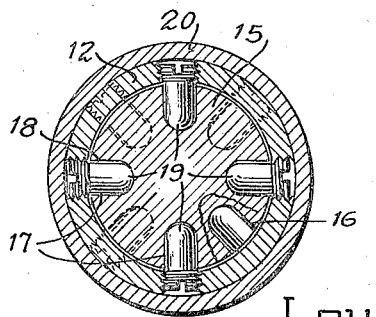
Fig. 3 is a transverse section taken through the same on the line 3—3 of Fig. 2.
Figure 4:
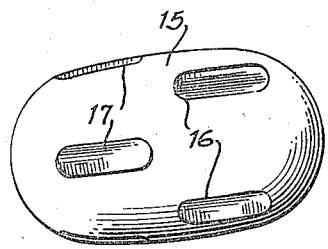
Fig. 4 is a detail perspective view of the gimbal block employed.

The gimbal block 15 is provided in its opposite end portions with circumferential rows of axially elongated slots 16 and 17. The slots 16 and 17 are arranged in offset or staggered relation as shown in Figs. 2, 3 and 4. The slots 16 and 17 do not overlap and thus a substantial body portion of the gimbal block 15 is interposed between the slots to lend rigidity and strength to the block. From Fig. 2 it will be noted that the bottom walls 18 of the slots extend substantially in parallelism with the axis of the block, and that owing to the elliptical configuration of the block 15, the slots 16 and 17 are gradually reduced in depth toward their outer ends. This construction maintains the gimbal block 15 from loose play in the sockets 12 and 14 when the block is withdrawn outwardly from the sockets and turned at an angle thereto. The slots 16 and 17 are given substantial depth for receiving relatively large coupling pins 19 which are carried by the sockets 12 and 14 and extend inwardly therefrom. Each pin 19 is screw threaded at its outer end and is secured thereat in a threaded opening formed through the wall of the adjacent socket, the outer end of the pin being also kerfed for the reception of the bit of a screw driver or the like used in placing and removing the pin.

Each socket 12 and 14 is provided with a number of pins 19 corresponding to that of the slots, 16 for one socket and 17 for the other socket. The pins 19 when engaged in the gimbal block 15 are thus disposed in circumferentially offset relation in the coupling and permit of the free flexing of the coupling when the shaft sections 10 and 11 are moved into relatively angular relation.

In order to maintain the coupling pins 19 from displacement, and to reinforce and strengthen the outer cylindrical portions of the sockets 12 and 14, each socket is provided with a ring or band 20 threaded about the outer end of each socket for binding upon and about the end and for covering the outer ends of the pin receiving openings.

In order to cover and protect the coupling against ingress of dust and foreign particles, and to retain a lubricant in and about the coupling, the same is provided with a flexible cover or sleeve 21 of leather or other suitable material which may be made in one or more pieces suitably secured about the coupling. The cover 21 is enlarged at its intermediate portion to give it the desired fullness to follow the sockets 12 and 14 when swung into different angular positions. The opposite ends of the cover 21 are reduced in diameter and closely fit the shaft sections 10 and 11 at their points of juncture with their sockets 12 and 14.

Flexible bands or otherwise suitably formed rings 22 are secured about the opposite ends of the cover 21 to clamp the same securely about the shaft sections 10 and 11 to seal the cover 21 over the joint.

The joint thus constructed may be easily assembled by first placing the rings 20 over the intermediate portion of the gimbal block 15, and then placing the sockets 12 and 14 over the opposite ends of the gimbal block. The sockets are now turned to register the threaded openings therein with the slots 16 and 17 and the pins 19 are then inserted radially inward through the socket openings and into the slots, and are secured in the socket openings by the screw threads. The sockets at this stage of assembling are engaging over the outer ends of the gimbal block 15, and the rings 20 are now screwed over the free ends of their respective sockets 12 and 14 and the latter may then be moved into abutting relation as shown in Fig. 2.

The length of the slots 16 and 17 permit the shaft sections 10 and 11 to be swung into relatively acute angles so that the sections have a wide range of swinging movement, one upon the other. The elongated formation of the gimbal block 15 permits of this wide range of movement, and the reduced ends of the gimbal block move freely against the cylindrical inner walls of the sockets 12 and 14.

It is of course understood that various changes and modifications may be made in the details of construction and design of the above specifically described embodiment of the invention without departing from the spirit thereof, and restricted only by the scope of the following claims.

What is claimed is:

1. A universal driving coupling comprising a pair of sockets, a gimbal block loosely fitting in said sockets, said block having a plurality of grooves extending lengthwise of the block and being positioned in staggered relation to each other, and a plurality of pins carried by the sockets, said pins loosely engaging in said grooves.

2. A universal driving coupling comprising of a pair of sockets, an elliptical gimbal block loosely fitting into said sockets, said block having rows of grooves arranged in staggered relation to each other, and inwardly extending coupling pins carried by the sockets for engagement in the grooves.

3. A universal driving coupling comprising a pair of sockets, said sockets having threaded end portions, a gimbal block loosely fitting at opposite ends in the sockets and having longitudinal grooves positioned in staggered relation to each other, coupling pins removably mounted in the sockets and engaging in said grooves, and reinforcing rings threaded over the inner ends of said sockets, said rings also being adapted to lock the coupling pins in the sockets.

4. A universal driving coupling comprising a pair of sockets having threaded end portions, a gimbal block fitting at opposite ends in said sockets, said block having longitudinal grooves arranged circumferentially about the block and in staggered relation to each other, coupling pins adjustably mounted in the sockets for engagement in the grooves, threaded rings adapted to reinforce the inner ends of the sockets and lock the pins in the sockets, and a flexible casing for said sockets secured at opposite ends thereof to the sockets to prevent dirt or other foreign matter from injuring the coupling.

5. A universal driving coupling comprising a pair of sockets, a gimbal block adapted to loosely seat at opposite ends thereof in said sockets, said block having two rows of longitudinal grooves, the grooves of one row being positioned in staggered relation to the grooves of the other row, coupling pins in said sockets and engaging in said grooves, reinforcing rings mounted about the inner ends of said sockets, said rings also being adapted to retain the coupling pins in position, and a flexible casing enclosing said sockets, said casing being removably secured at opposite ends to the outer ends of said sockets.

LOUIS E. LA CROIX.